United States Patent [19]

Marioni et al.

[11] Patent Number: 5,668,425
[45] Date of Patent: Sep. 16, 1997

[54] STARTUP DEVICE FOR THE ROTOR OF A PERMANENT-MAGNET SYNCHRONOUS MOTOR

[75] Inventors: Elio Marioni; Vittorio Cavalcante, both of Dueville, Italy

[73] Assignee: Askoll A.p.A., Dueville, Italy

[21] Appl. No.: 583,385

[22] Filed: Jan. 5, 1996

[30] Foreign Application Priority Data

Jan. 19, 1995 [IT] Italy ................ PD95A0013

[51] Int. Cl.[6] .................. F04D 13/02; F04D 29/10
[52] U.S. Cl. ............. 310/162; 310/75 D; 310/78; 310/92; 310/100; 464/85; 464/92; 464/112; 464/180
[58] Field of Search ................. 310/78, 75 D, 310/92, 100; 464/85, 92, 34, 180, 112

[56] References Cited

U.S. PATENT DOCUMENTS

| 4,433,261 | 2/1984 | Nashiki | 310/156 |
|---|---|---|---|
| 5,359,248 | 10/1994 | Nagate et al. | 310/156 |

FOREIGN PATENT DOCUMENTS

0551370B1  3/1995  France.

*Primary Examiner*—Steven L. Stephan
*Assistant Examiner*—Tran N. Nguyen
*Attorney, Agent, or Firm*—Guido Modiano; Albert Josif

[57] ABSTRACT

An improved startup device for the rotor of a permanent-magnet synchronous motor, particularly adapted for liquid conveyance pumps, such as those used in electrical household appliances or the like, which are equipped with a permanent-magnet synchronous motor of the type comprising a stator unit with a pack of metal laminations and electrical windings supported by a body that forms a substantially cylindrical chamber that accommodates, upon assembly, the rotor unit, which is axially crossed by a motor shaft. The rotor unit comprises a cup-shaped cylindrical element that is closed hermetically by means of a lid and is rigidly coupled to the shaft either directly or by means of the lid; the permanent-magnet rotor is rotatably accommodated inside the cup-like element and rotates freely with respect to the shaft; motion transmission teeth are provided between the rotor and the shaft and are adapted to cause the rotation of the shaft after the rotor, activated by the stator, has turned without a load through a given rotation angle.

23 Claims, 7 Drawing Sheets

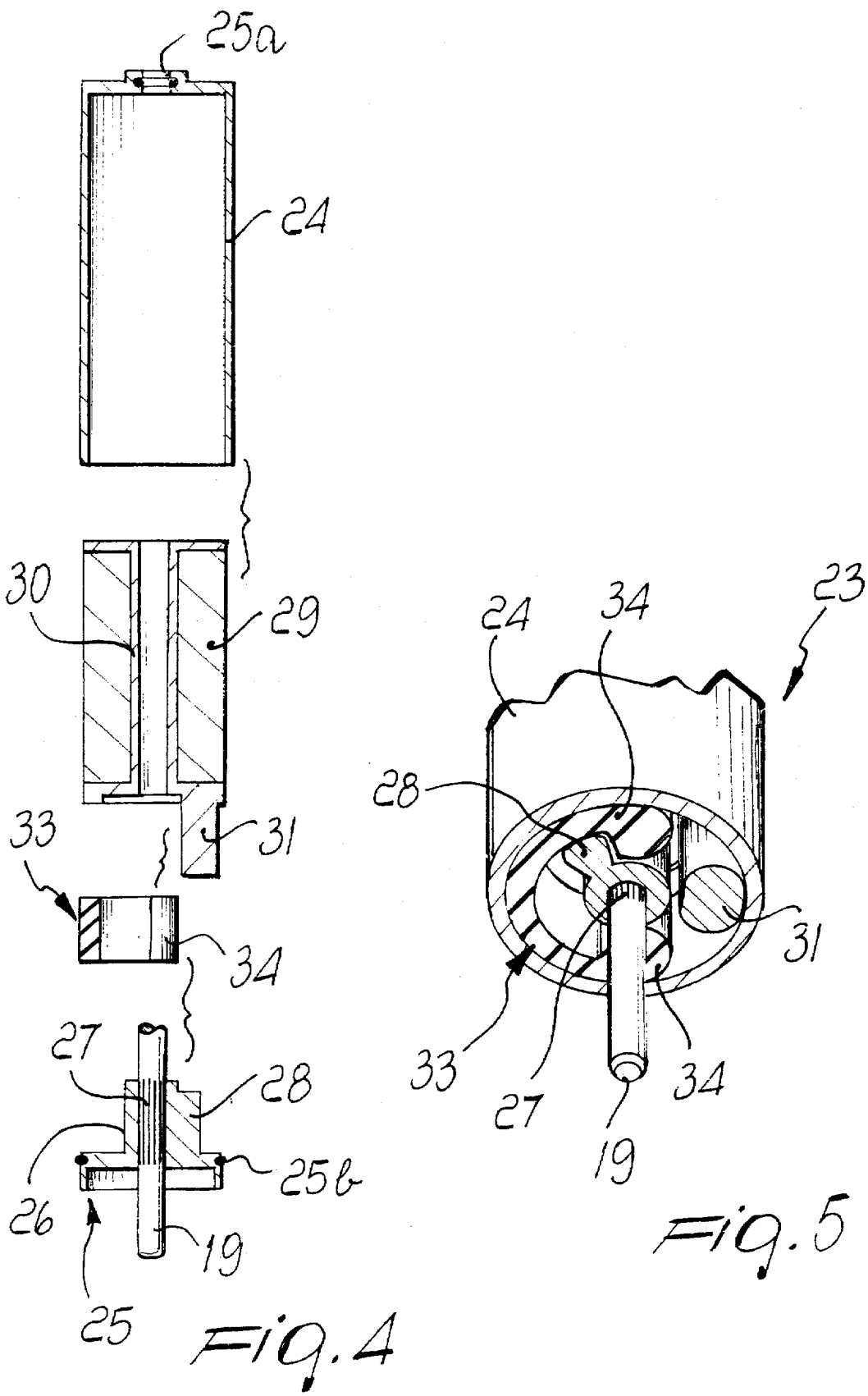

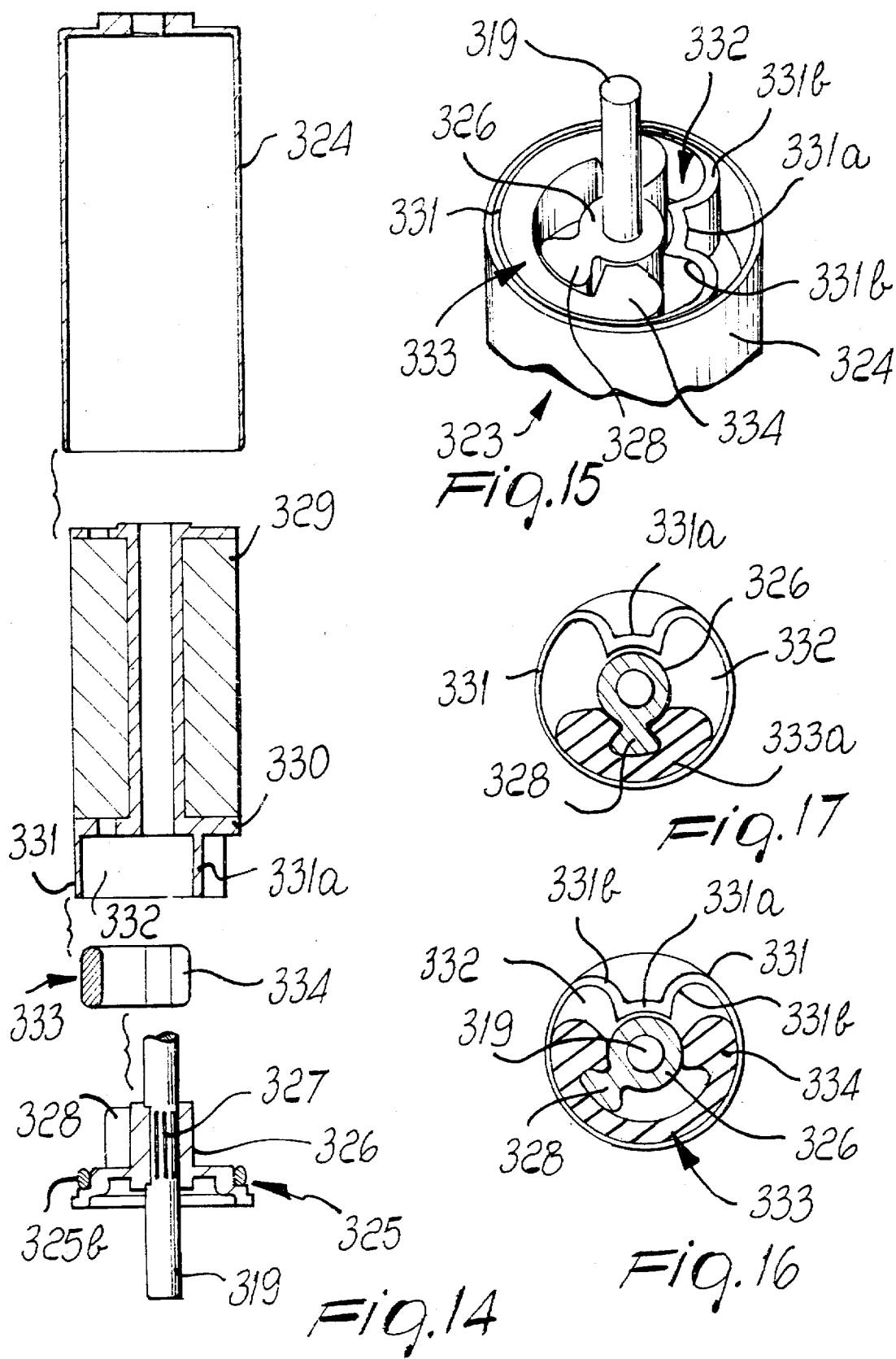

STARTUP DEVICE FOR THE ROTOR OF A PERMANENT-MAGNET SYNCHRONOUS MOTOR

BACKGROUND OF THE INVENTION

The present invention relates to an improved startup device for the rotor of a permanent-magnet synchronous motor.

The device is particularly adapted for liquid conveyance pumps, such as those used in electric household appliances or the like.

In the field of electric household appliances or the like, pumps are conventionally used that are equipped with a permanent-magnet synchronous motor and must convey the washing fluids (lye) of said appliances.

The synchronous motor is composed of an electromagnet which is arranged outside the pump body and transmits an alternating electromagnetic field to the permanent magnet accommodated inside said pump body.

The variable electromagnetic flux, as known, imparts to the rotor, constituted by the permanent magnet, a torque that causes its rotation and accordingly, by virtue of motion transmission means, the rotation of the elements connected thereto.

In conventional pump models, especially in the simplest and cheapest ones, the rotor is rigidly coupled to the pump shaft by molding in place plastic material; the pump furthermore comprises disengagement devices by virtue whereof said shaft rotates without a load (freely) at least through a certain rotation angle, after which it starts to transmit motion to the impeller and therefore to the applied load.

Conventional systems for deferred actuation (or disengagement), despite performing their tasks, are not free from drawbacks.

Among these drawbacks, the most important are the mechanical wear and the seizure of said disengagement systems and therefore their deterioration, which is caused mainly by the abrasive action of the lye and of the aggressive substances contained therein.

The possibility of limiting this deterioration has been the subject of sometimes in-depth studies and researches aimed at solving the problem; the solutions that have been found are mainly based on protecting the disengagement system with systems such as:

dynamic sealing elements (for example lip seal rings or O-rings); however, since these elements are in turn subject to wear, they merely delay the contact between the lye and the disengagement elements and therefore do not solve the problem radically;

labyrinth-type geometries of various kinds and shapes, used particularly in pumps of the above mentioned type, executed with the so-called "submersed-rotor" technology, which despite limiting the contact between the disengagement elements and the aggressive particles that have an excessive size do not protect said elements from hard water (scale-producing water) or from the microscopic impurities that are dissolved in the lye and cause, by accumulation, the seizure and wear of the moving parts.

In any case, direct or indirect contact with conventional disengagement systems causes, in a short time, malfunctions of the pump, such as for example:

an increase in startup noise, caused by the impact between the mechanical parts that transmit motion to the load until the synchronous speed of the rotor has been reached; this increase is generated by the deterioration of the shock-absorbing systems generally provided to cushion the impact, at rotor startup, on the devices that transmit motion to the impeller;

an increase in the noise level in operation in air and water, generated by the deterioration of the mechanical friction means (such as O-rings) provided in order to prevent early occurrence of the pole swapping of the rotating permanent magnet with respect to the movement of the impeller, which causes continuous knocking between said impeller and the rotor or, more precisely, the motion transmission means.

Further drawbacks to be mentioned are the early wear of the bushes provided for the movement of the shaft and therefore malfunctions and unwanted vibrations caused by the gradual increase in the imbalance of the rotor unit once said disengagement systems deteriorate, as well as the impossibility to maintain a constant production quality in the manufacture of the pump, mainly due to the difficulty of maintaining constant assembly tolerances.

A final drawback is caused by the fact that when these pumps are powered at lower-than-nominal voltages (as occurs in particular geographical regions of all countries), the perfect operation and the integrity of the disengagement system are essential; if they are not present, the rotor has difficulty in starting and knocking between the motion transmission elements again produces noise as well as pickup delay, with consequent loss of performance of the device in which the pump is included.

SUMMARY OF THE INVENTION

A principal aim of the present invention is to solve the above-mentioned drawbacks of conventional permanent-magnet motors with a rotor startup device that is reliable in the course of time, quiet, constructively simple, but most of all is insulated from any kind of contact with the fluid being conveyed.

According to this aim, an object of the present invention is to provide a startup device in which the rotor and the motion transmission devices are contained in a hermetic space and are therefore not in contact with the lye or with other aggressive fluids.

Another object of the present invention is to provide a startup device that is practically noise-free, even at startup, said noise remaining in any case at substantially negligible levels even during steady-state operation in all operating conditions.

Another object of the present invention is to provide a startup device the production whereof can be achieved while maintaining constant quality standards and preset tolerances.

Another object is to provide a startup device that can be easily adapted, maintaining excellent levels of quietness and reliability, to discharge pumps for electrical household appliances or other machines of different kinds and in different fields of use.

This aim, these objects, and others which will become apparent hereinafter are achieved by an improved startup device for the rotor of a permanent-magnet synchronous motor, of the type comprising a stator unit with a pack of metal laminations and electrical windings supported by a body that forms, between two poles, a substantially cylindrical chamber that accommodates, upon assembly, a rotor unit that is axially crossed by a shaft; said device being characterized in that the rotor unit comprises a cup-shaped cylindrical element that is closed hermetically by a lid and is rigidly coupled to said shaft either directly or through said lid, the permanent-magnet rotor being rotatably accommodated inside the cup-shaped element, said rotor rotating freely with respect to the shaft, motion transmission means being provided between said rotor and said shaft, said means being adapted to cause the rotation of said shaft after said rotor, activated by the stator, has turned without a load through a given rotation angle.

BRIEF DESCRIPTION OF THE DRAWINGS

Further characteristics and advantages of the present invention will become apparent from the description of some embodiments thereof, illustrated only by way of non-limitative example in the accompanying drawings, wherein:

FIG. 4 is an exploded view of the pump of FIG. 1;

FIG. 5 is an axonometric view of a detail of the pump of FIG. 1;

FIG. 14 is an exploded view of the rotor unit in a fourth embodiment;

FIG. 15 is an axonometric view of a detail of the rotor unit of FIG. 14;

FIG. 16 is a transverse sectional view of the rotor unit of FIG. 14;

FIG. 17 is a transverse sectional view of a different embodiment of the rotor unit of the fourth embodiment.

DESCRIPTION OF THE PREFERRED EMBODIMENTS

Figure 1:
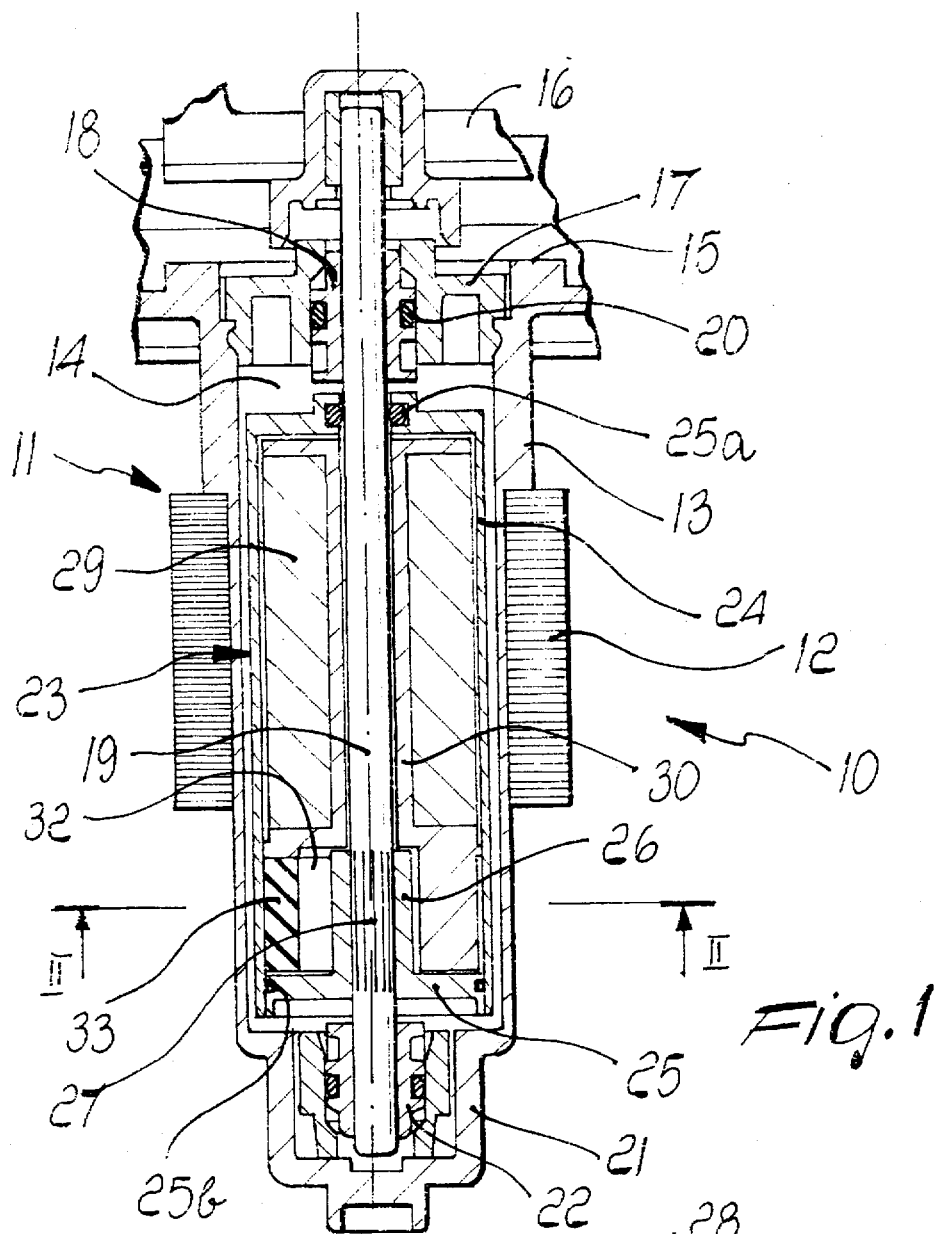
FIG. 1 is a sectional view, taken along a diametrical plane, of a pump according to the invention, in a first embodiment.

With particular reference to FIGS. 1-2 and 4-5, a pump with a permanent-magnet synchronous motor, particularly for electrical household appliances or the like, according to the invention, is generally designated by the reference numeral 10 in a first embodiment.

The pump 10 comprises a stator unit, generally designated here by the reference numeral 11, which is constituted by a stator 12 that is an electromagnet supplied with alternating current and supported by a body 13 that forms a substantially cylindrical chamber 14 that is located between two poles and has one end 15 that is open at the impeller 16.

The end 15 is closed, upon assembly, by an axially perforated disk-like element 17 that axially accommodates a self-centering bush 18, which contributes to the rotatable support of a shaft 19; the impeller 16 is keyed to the end of said shaft that protrudes from the disk-like element 17.

Contact between the self-centering bush 18 and the disk-like element 17 is mediated by an elastomeric O-ring 20.

Another self-centering bush 22 is furthermore accommodated at the end 21 lying opposite to the end 15, inside the body 13; said bush helps to support the shaft 19 so that it can rotate.

A rotor unit, generally designated by the reference numeral 23, is accommodated inside the chamber 14 upon assembly.

The rotor unit 23 is axially crossed by the shaft 19 and comprises a cup-shaped cylindrical element 24 that is closed hermetically, at the opposite end with respect to the impeller 16, by means of a lid 25.

The tightness of the rotor unit 23 is ensured in this case by two static sealing rings, such as O-rings, which are respectively designated by the reference numerals 25a, between the cup-shaped element 24 and the shaft 19, and 25b, between the lid 25 and the cup-shaped element 24.

Said rings can optionally be omitted if hermetic tightness can be obtained by simple interference between the coupled parts.

The lid 25 is shaped so that it extends axially, upon assembly, with an inward orientation with respect to the cup-shaped element 24, forming a tubular element 26 that surrounds the shaft 19 and is fixed thereto in a region 27 of said shaft that is appropriately knurled.

A shaped ridge or raised portion 28 furthermore protrudes radially from the tubular element 26.

A permanent-magnet rotor 29 is contained inside the cup-shaped element 24 upon assembly; a shaped element 30, made of plastics, is molded in place over said rotor and, in addition to covering the rotor 29 at the regions that are adjacent to the shaft 19, it runs parallel to the axis of the pump 10 and in the opposite direction with respect to the impeller 16, so as to form a motion transmission tooth 31 which, in this case, has a substantially elliptical cross-section that is slightly ground along the less curved portions.

The rotor unit 23 thus formed has a chamber 32 formed by the cup-shaped element 24, by the lid 25, and by the shaped element 30.

Said chamber 32 is hermetic, and a shock-absorbing element 33, made of elastomer in this case, is placed inside said chamber upon assembly; said shock-absorbing element is substantially strip-like and is contoured so that its edges, which are opposite and are arranged parallel to the longitudinal extension of the pump 10, form two bulbous parts 34 that are interposed between the tooth 31 and the shaped ridge 28 in the travel paths of these parts, which per se interfere with each other.

The shaped shock-absorbing element 33 is movable with respect to the tooth 31 and to the shaped ridge 28, and its dimensions and geometries are such that it provides a certain friction against the walls of the cup-shaped element 24 when the motor starts, that is to say, when the tooth 31 alternatively strikes one of the two bulbous parts 34, therefore considerably reducing the impact force between the tooth 31 and the shaped ridge 28 and thus the knocking noise.

In order to allow constant friction at all times between the element 33 and the cup-shaped element 24, a viscous lubricating liquid may be introduced; since the rotor unit 23 is hermetic, said liquid always remains inside said cup-shaped element 24.

Said viscous liquid can also be arranged between the rotor 29 and the cup-shaped element 24, thus contributing, albeit to a small extent, to a further reduction in the speed of the impact between the tooth 31 and the ridge 28, therefore reducing the resulting noise.

In practice, operation is as follows: when the stator 12 is energized by means of an alternating current, it induces an alternating magnetic field on the rotor 29; due to the well-known laws of electromagnetism, a torque occurs on said rotor and causes its rotation.

The rotary motion of the rotor 29 also turns the tooth 31, which moves freely through a certain rotation angle, after which it interferes first with one of the bulbous parts 34 of the shock-absorbing element 33 and then with the shaped ridge 28, thus turning the lid 25 and the cup-shaped element 24.

Since the lid 25 is rigidly coupled to the shaft 19, its movement also causes the movement of said shaft and cup-shaped element 24 which are jointly rotatable, and, finally, of the impeller 16 as well.

Since the shock-absorbing element 33 has two bulbous parts arranged as described above, it is able to cushion, by interposing itself, the impact between the shaped ridge 28 and the tooth 31, regardless of the direction of the rotation imparted thereto by the phase of the stator 12.

Moreover, if the tooth 31 is already proximate to the shaped ridge 28, once the stator has been energized and the rotor 29 has therefore been set in motion, if the static torque is sufficient to overcome the resistances of the impeller 16, the tooth 31 indeed continues in its rotational direction; otherwise said tooth, after waiting for the phase change of the stator 12, and while slightly pushing the shaped ridge 28 (which however it fails to move), resumes rotating in the opposite direction, thus having a free rotation sector available, during which the rotor 29 starts absolutely with no load, and a subsequent free rotation sector having an almost insignificant and calibrated load and allowing on one hand the rotor 29 to perform pole swapping, increasing its static torque until it reaches synchronization and overcomes the load applied to the impeller 16, and on the other hand, to reduce the impact between the tooth 31 and the ridge 28 by virtue of the minimal friction between the shock-absorbing element 33 and the walls of the cup-shaped element 24.

Figures 2, 3:
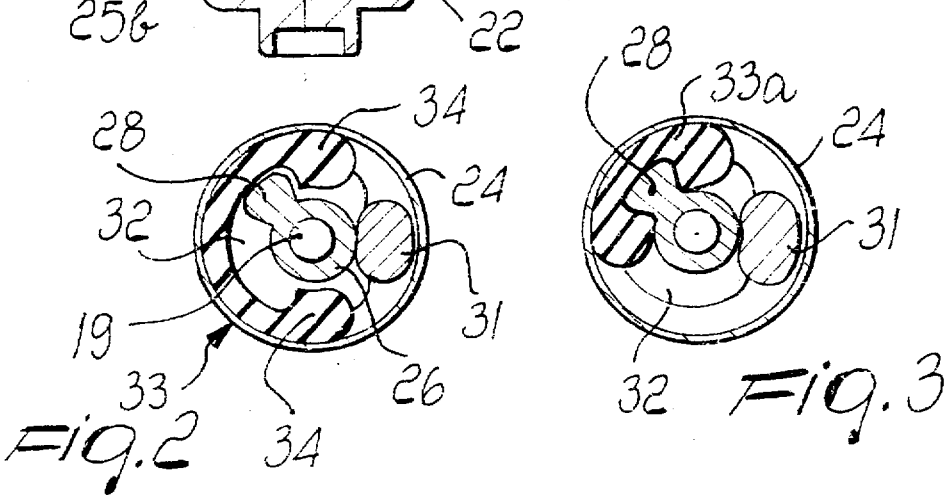
FIG. 2 is a transverse sectional view, taken along the plane II—II of FIG. 1.
FIG. 3 is a transverse sectional view, taken along a plane that corresponds to the one of FIG. 2, of a different embodiment of the pump of FIG. 1.

With reference now to FIG. 3, in a different embodiment, the shock-absorbing element 33 is replaced with a shock-absorbing element 33a that is jointly coupled to the ridge 28 and is therefore movable therewith, since it is inserted in a fixed position or molded in place thereon.

Figure 6:
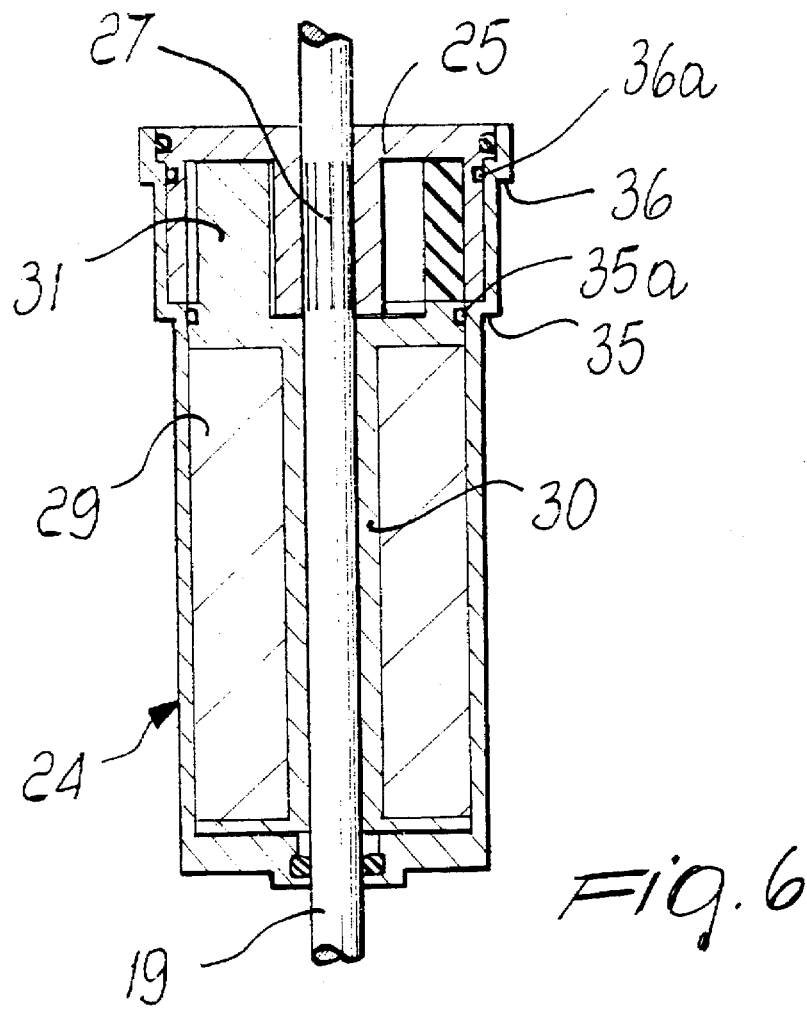
FIG. 6 is a sectional view of a detail of the pump of FIG. 1, in a possible different embodiment thereof.
Figure 7:
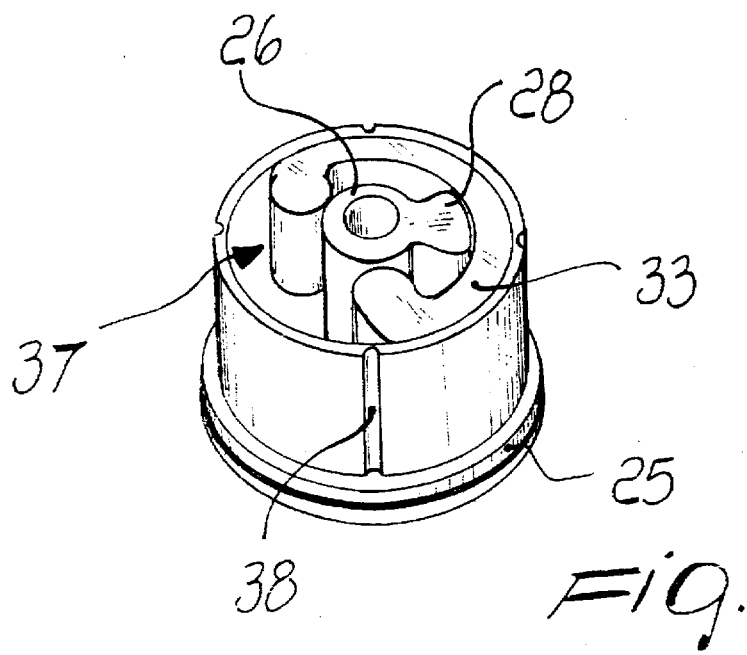
FIG. 7 is an axonometric view of a detail of the embodiment of FIG. 6.

With particular reference to FIGS. 6 and 7, a different embodiment related to the first embodiment of the pump 10 is shown.

Said different embodiment does not feature substantial differences with respect to what has been described with reference to FIGS. 1 to 4, except for the shape of the cup-shaped element 24 which in this embodiment has two diametrical discontinuities that form two external 35 and 36, and respectively internal 35a, 36a steps at the impeller 16.

This solution, as an alternative to what is shown in FIGS. 1 to 5, allows to insert the shock-absorbing element 33 inside a chamber 37 formed directly on the lid 25, and can facilitate the operations for handling and assembling the shock-absorbing element itself.

Venting channels 38 are furthermore provided to prevent air from being compressed inside the cup-shaped element 24 when the lid 25 is being assembled.

Figure 8:
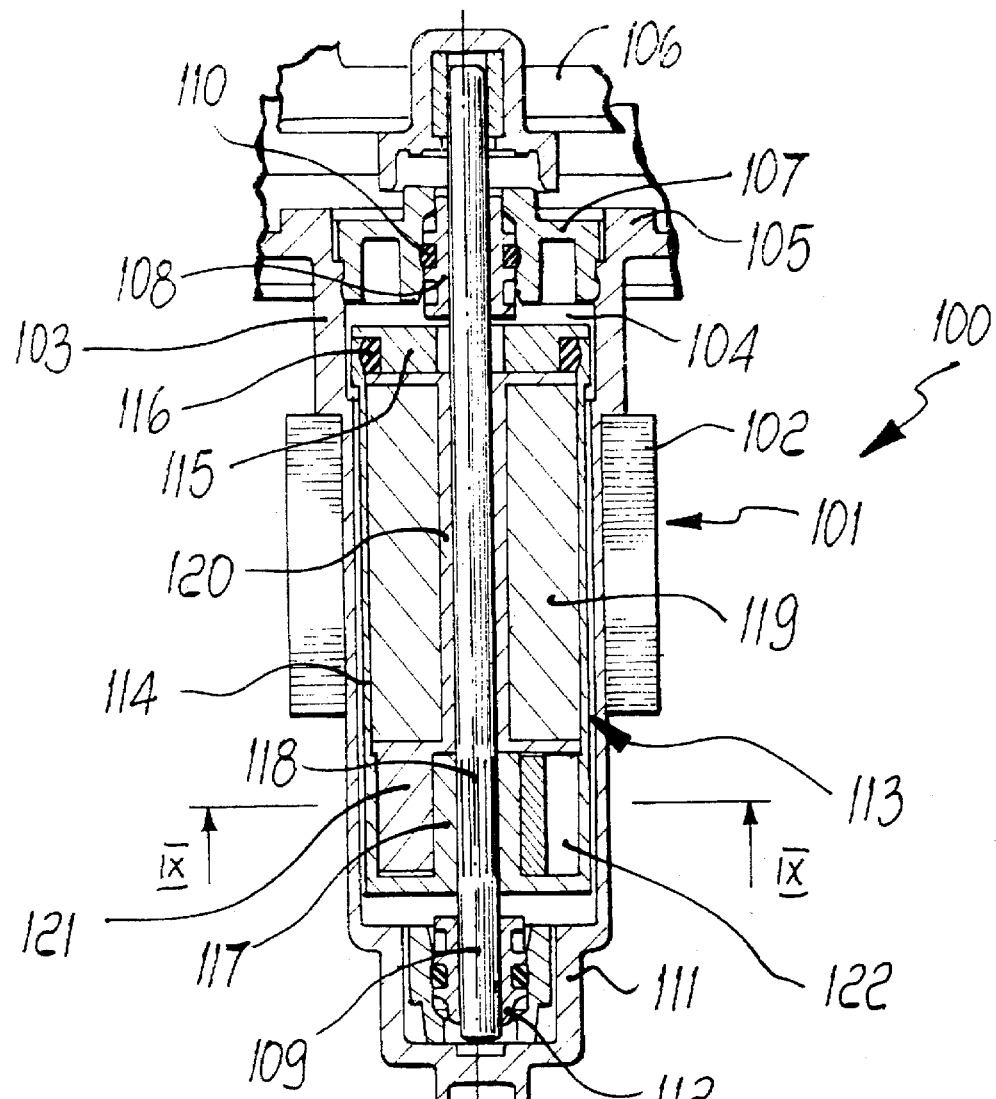
FIG. 8 is a diametrical sectional view of a pump according to the invention, in a second embodiment.
Figure 9:
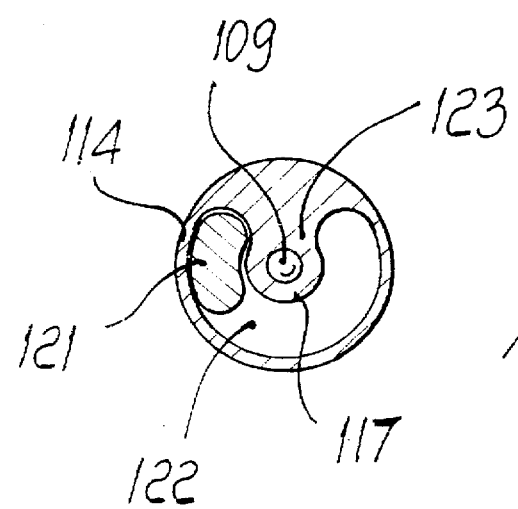
FIG. 9 is a transverse sectional view of the rotor unit, taken along the plane IX—IX of FIG. 8.
Figure 10:
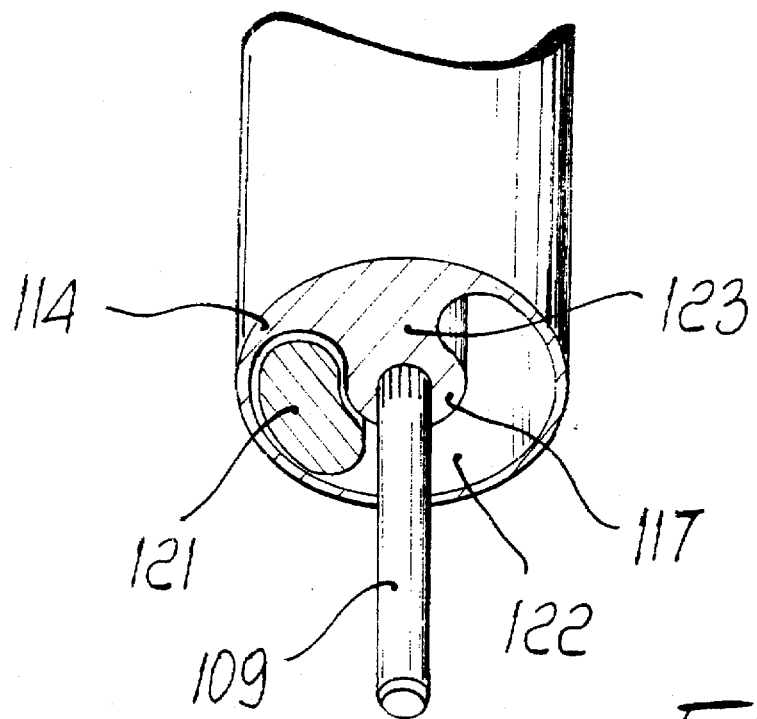
FIG. 10 is an axonometric view of a detail of the pump of FIG. 8.

With particular reference to FIGS. 8 to 10, a pump with a permanent-magnet synchronous motor, particularly for electrical household appliances or the like, is generally designated by the reference numeral 100 in a second embodiment.

The pump 100 comprises a stator unit 101 constituted by a stator 102 supported by a body 103 that forms a chamber 104 having an open end 105 at an impeller 106.

Said end is closed, upon assembly, by a disk-like element 107 that accommodates a self-centering bush 108 that cooperates to the support of a shaft 109.

An element constituted by an elastomeric O-ring 110 is interposed between the self-centering bush 108 and the disk-like element 107.

Another self-centering bush 112 is accommodated inside the body 103 at the end 111 that lies opposite to the end 105 and also cooperates for the rotatable support of the shaft 109.

A rotor unit, generally designated by the reference numeral 113 and axially crossed by the shaft 109, is rotatably accommodated inside the body 103.

The rotor unit 113 comprises a cup-shaped element 114 that is hermetically closed by a lid 115 on the side of the impeller 106.

An O-ring 116 is interposed, indeed to provide a seal, between the lid 115 and the cup-shaped element 114.

The cup-shaped element 114 furthermore extends, at the opposite end with respect to the impeller 106, and in an inward direction, so as to form a tubular element 117 that surrounds the shaft 109 and is fixed thereto in an appropriately knurled region 118.

A rotor 119 is rotatably accommodated inside the cup-shaped element 114, and a shaped element 120 is molded in place on said rotor; said shaped element covers said rotor at the regions that are adjacent to the shaft 109 and extends, upon assembly, in a direction that is parallel to the axial direction and with the opposite orientation with respect to the impeller 106, so as to form a tooth 121.

In opposition to the impeller 106, the shaped element 120 and the cup-shaped element 114 internally form a chamber 122 inside which the tooth 121 can rotate freely, except for a region that is occupied by a raised portion 123 extending from the internal surface of the cup-shaped element 114, said raised portion 123 being axially perforated and crossed by the shaft 109.

The raised portion 123 furthermore has an external surface that is substantially shaped so as to match the tooth 121.

As regards the operation of the pump 100 in this second embodiment, reference is made to what has been stated with regard to the first embodiment; here it is merely noted that the particular shape of the tooth 121 and of the raised portion 123 cause the impact during the pickup stage to be cushioned and evened out appropriately by virtue of the interposition of a lubricating fluid having a preset viscosity.

Figure 11:
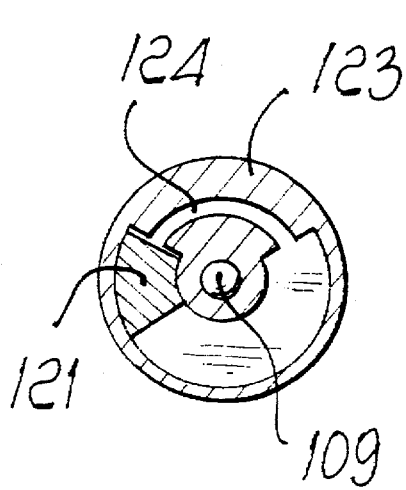
FIGS. 11 and 12 are, respectively, transverse sectional views of different embodiments of the pump of FIG. 8.
Figure 12:
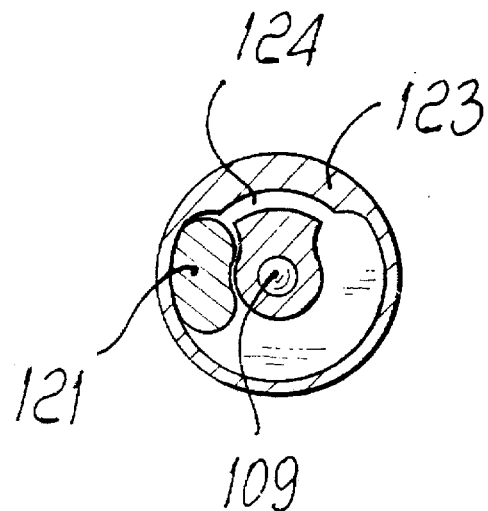

FIGS. 11 and 12 illustrate in particular two different embodiments of the tooth 121 and of the raised portion 123, without altering what has been stated with regard to this second embodiment.

In particular, with reference to FIG. 11, the tooth 121 is shaped substantially like an annular segment, and the raised portion 123 has a through channel 124 extending substantially along a circular arc; furthermore, inside the chamber 122 there is a fluid of preset viscosity which, by passing through the channel 124, causes a dissipation of energy that cushions the impact between the tooth 121 and the raised portion 123.

With reference to FIG. 12, in a second further embodiment the tooth 121 has a substantially elliptical compressed shape and the raised portion 123 is substantially shaped complementarily thereto; in this embodiment, too, said raised portion is provided with the through channel 124 and the above mentioned fluid adapted to dissipate, in passing through the channel 124, the impact energy during the pickup stage is also provided.

Figure 13:
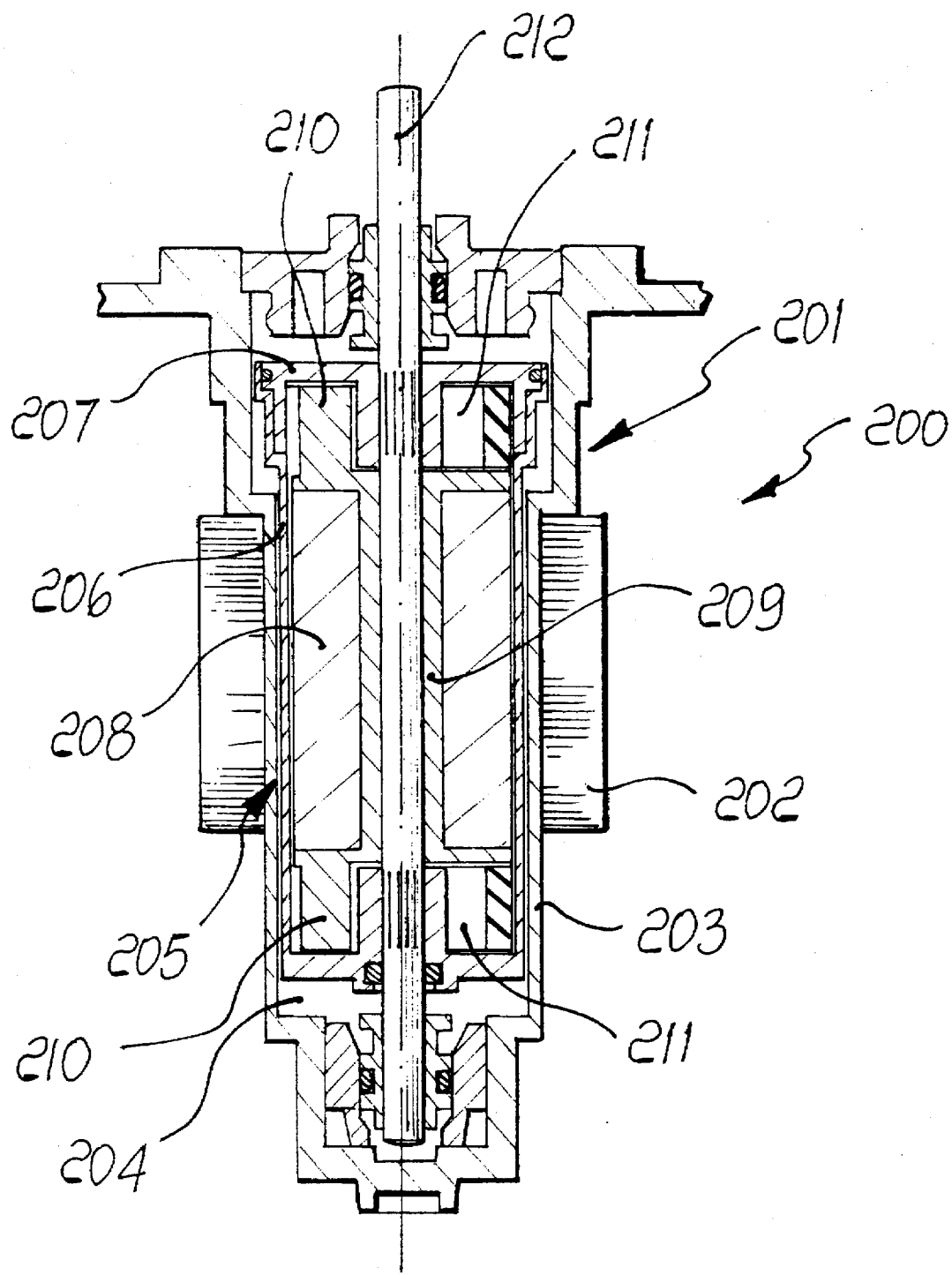
FIG. 13 is a view of a pump according to the invention in a third embodiment.

With particular reference to FIG. 13, a pump with a permanent-magnet synchronous motor, in a third embodiment, is generally designated by the reference numeral 200.

The pump 200 comprises a stator unit 201 constituted by a stator 202 and by a body 203 that forms a chamber 204 inside which a rotor unit 205 is rotatably accommodated.

The rotor unit 205 comprises a cup-shaped element 206 that is closed by a hermetic lid 207.

The cup-shaped element 206 in turn rotatably internally accommodates a rotor 208 whereon a shaped element 209 is molded in place.

Without altering what has been described with regard to the previous embodiments, the particularity of this third embodiment resides in that two teeth 210 extend from the shaped element 209 along an axis that is parallel to the axis of the pump 200 but with mutually opposite directions; said teeth interfere with corresponding raised portions 211 that extend from the lid 207 and from the inner surface of the cup-shaped element 206.

In this third embodiment, by having two teeth 210, a greater balancing of the static torque is achieved, with a consequent lower lack of compensation of the torsion moments that act on the shaft, which is designated here by the reference numeral 212.

With reference now to the above mentioned FIGS. 14 to 16, in a fourth embodiment of the pump, the rotor unit 323 is axially crossed by the shaft 319 and comprises a cup-shaped cylindrical element 324 that is closed hermetically at the opposite end with respect to the impeller, not shown, by means of a lid 325.

The hermetic tightness of the rotor unit 323 is ensured in this case by a static sealing ring, such as an O-ring, 325b between the lid 325 and the cup-shaped element 324.

Said ring can optionally be omitted if hermetic tightness can in any case be achieved by simple interference between the coupled parts or, if it is not ensured, by welding (for example ultrasonically) the lid 325 to the cup-shaped element 324.

The lid 325 is shaped so as to extend axially, upon assembly, in an inward direction with respect to the cup-shaped element 324, forming a tubular element 326 that surrounds the shaft 319 and couples thereto in a region 327 thereof that is appropriately knurled.

A shaped raised portion 328 furthermore extends radially from the tubular element 326.

A permanent-magnet rotor 329 is contained inside the cup-shaped element 324, upon assembly, and a shaped element 330 made of plastic material is molded in place thereon; in addition to covering the rotor 329 at the regions that are adjacent to the shaft 319, said shaped element runs parallel to the axis of the pump and in the opposite direction with respect to the impeller, so as to form a cylindrical wall 331 having a recess that forms a motion transmission tooth 331a.

The rotor unit 323 thus formed has a chamber 332 formed by the wall 331, by the lid 325 and by the shaped element 330.

Upon assembly, a shock-absorbing element 333, in this case made of elastomeric material, is placed inside said chamber 332; said element is substantially strip-like and is shaped so that its opposite edges arranged parallel to the longitudinal extension of the pump form two bulbous parts 334 that are interposed between the tooth 331a and the shaped raised portion 328, along the paths for the movement thereof, which per se interfere with each other.

The shaped shock-absorbing element 333 is movable with respect to the tooth 331a and with respect to the shaped raised portion 328 and has dimensions and geometries that produce a given friction against the wall 331 at motor startup, that is to say, when the tooth 331a alternatively strikes one of the two bulbous parts 334, with respect to which it is conveniently complementarily shaped (thus having respective concave portions 331b), therefore considerably reducing the impact force between the tooth 331a and the shaped raised portion 328 and therefore the knocking noise.

The presence of the wall 331 prevents the cup-shaped element 324 from being subjected to deformations after prolonged use.

In order to allow constant friction at all times between the element 333 and the wall 331, it is optionally possible to introduce a viscous lubricating liquid which, since the rotor unit 323 is hermetic, always remains inside the wall 331.

With particular reference now to the previously mentioned FIG. 17, a different embodiment entails that the shock-absorbing element, now designated by the reference numeral 333a, is made in such a manner as to be shaped complementarily to the raised portion 328, surrounding it and being rigidly coupled thereto.

In practice it has been observed that the intended aim and objects have been achieved; in particular, it should be noted that rotary motion is transmitted to the impeller by virtue of mechanisms that are very simple but ensure a soft startup that is almost entirely free from unpleasant knocking, which is common to conventional models.

It is also noted that the rotor and the motion transmission devices, by being accommodated in perfectly hermetic chambers, are not subjected to the degradation caused by the aggressive action of the lye or of other working fluids.

The constructive flexibility of the pump according to the invention, which can adapt to the most disparate requirements and uses, should also be noted.

It should also be noted that the execution of the pump according to the invention adopts technologies which, used more efficiently, allow a constant quality standard and an easily controllable tolerance level.

It should also be noted that the introduction, for example, of viscous fluids can further improve the damping of pickup knocking.

The present invention is susceptible of numerous modifications and variations, all of which are within the scope of the inventive concept.

The constructive details may be replaced with other technically equivalent elements.

The materials and the dimensions may be any according to the requirements.

What is claimed is:

1. A startup device for a rotor of a permanent-magnet synchronous motor of the type having:

a stator unit with a pack of metal laminations and electrical windings supported by a body, said body forming between poles of the stator unit, a substantially cylindrical chamber;

a rotor unit, including a permanent-magnet rotor being accommodated in said chamber; and a shaft which crosses axially said rotor unit;

said device comprising:

a cup-shaped cylindrical element being accommodated in said cylindrical chamber, said rotor unit being enclosed within said cup-shaped cylindrical element so as to freely rotate with respect to said shaft;

a lid for hermetically closing said cup-shaped element, said lid being rigidly coupled to said shaft, said cup-shaped element and said lid being jointly rotatable with said shaft;

motion transmission means being provided between said permanent-magnet rotor and said shaft, and said transmission means being enclosed inside the cup-shaped element;

wherein said transmission means causes rotation of said shaft after said permanent-magnet rotor, being activated by said stator, is turned without a load through a given rotation angle.

2. Device according to claim 1, wherein said rotor unit and said cup-shaped element form, inside said cup-shaped element, at least one chamber in which said motion transmission means are accommodated.

3. Device according to claim 1, wherein said motion transmission means comprises at least one tooth, said tooth being rigidly coupled to one end of said permanent-magnet rotor and, when said permanent-magnet rotor starts to rotate, the tooth transmits motion to at least one raised portion, said raised portion being provided so as to extend from and to be rigidly coupled to either of said cup-shaped element and said lid.

4. Device according to claim 3 comprising shock-absorbing means for cushioning pickup contact between said at least one tooth and said at least one raised portion.

5. Device according to claim 3, wherein said at least one raised portion is monolithic with either of said cup-shaped element and said lid.

6. Device according to claim 3, wherein said at least one tooth and said at least one corresponding raised portion have complementary shapes for allowing pickup impact to be cushioned and evened out.

7. Device according to claim 3, wherein said at least one raised portion is axially perforated for being crossed by said shaft.

8. Device according to claim 4, wherein said shock-absorbing means comprises an elastomeric shaped element arranged between said at least one tooth and the corresponding at least one raised portion so as to cushion their impact during startup.

9. Device according claim 8, wherein said elastomeric shaped element is arranged loosely in a space between said tooth and said shaped raised portion.

10. Device according to claim 9, wherein said cup-shaped element forms a chamber, said elastomeric shaped element being movable, with respect to said tooth and said shaped raised portion, inside said chamber with a preset friction against peripheral walls of said chamber.

11. Device according to claim 8, wherein said elastomeric shaped element is jointly coupled to said shaped raised portion and is therefore movable therewith.

12. Device according to claim 10, wherein a preset amount of a lubricating fluid of preset viscosity is introduced in said chamber.

13. Device according to claim 12, wherein said fluid acts as a fluidic shock absorber by interposing itself between moving parts contained in said cup-shaped element.

14. Device according to claim 12, wherein a channel is formed on said at least one raised portion, said lubricating fluid being compressed through said channel for dissipating energy due to its load losses, said channel providing thus a fluidic shock absorber between said at least one tooth and said at least one shaped raised portion.

15. Device according to claim 3, wherein said at least one tooth is made of plastic material which is molded in place over said permanent-magnet rotor.

16. Device according to claim 4, wherein said cup-shaped element has, both at its inner surface and at its outer surface, at least two diametrical discontinuities forming corresponding steps, said diametrical discontinuities being provided in said body as well, due to rotational requirements.

17. Device according to claim 16, wherein said lid is shaped as a plug comprising a chamber for said shock-absorbing element, the lid being accommodated at discontinuities formed internally to said cup-shaped element.

18. Device according to claim 17, wherein said chamber has at least one air vent for letting our air which is in excess during coupling to said cup-shaped element.

19. Device according to claim 1, wherein a shaped element made of plastic material is molded in place over said permanent-magnet rotor, said shaped element, in addition to covering said permanent-magnet rotor at regions that are adjacent to the shaft, extends axially so as to form a cylindrical wall, said wall having a recess which forms a motion transmission tooth, said transmission tooth constituting said motion transmission means and, said shaped element forming, together with said lid, a chamber, a shock-absorbing element being placed inside said chamber.

20. Device according to claim 19, wherein said recess has two concave portions that are shaped complementarily to respective bulbous end parts of said shock-absorbing element.

21. A centrifugal pump comprising an impeller and the permanent-magnet synchronous motor with the startup device as set forth in claim 1, wherein said motion transmission means comprises at least one tooth and a corresponding at least one raised portion, said at least one tooth and one raised portion extending on a side of said pump where the impeller is mounted.

22. A centrifugal pump comprising an impeller and the permanent-magnet synchronous motor with the startup device as set forth in claim 1, wherein said motion transmission means comprises at least one tooth and a corresponding at least one raised portion, said at least one tooth and said at least one raised portion extending in opposition to a side where the impeller of said pump is mounted.

23. A centrifugal pump comprising an impeller and the permanent-magnet synchronous motor with the startup device as set forth in claim 1, wherein said motion transmission means comprises at least one tooth and a corresponding at least one raised portion, said at least one tooth and at least one corresponding raised portion extending on a side where the impeller of the pump is mounted and at least one tooth and at least one corresponding raised portion extending to a side in opposition to said impeller.

* * * * *